United States Patent Office 3,714,283
Patented Jan. 30, 1973

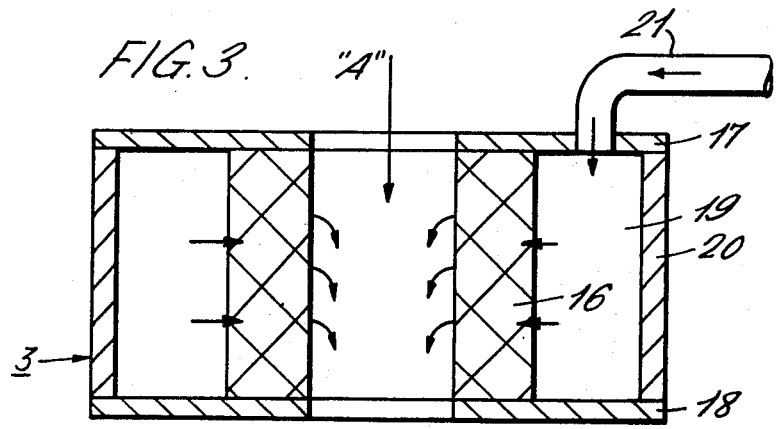
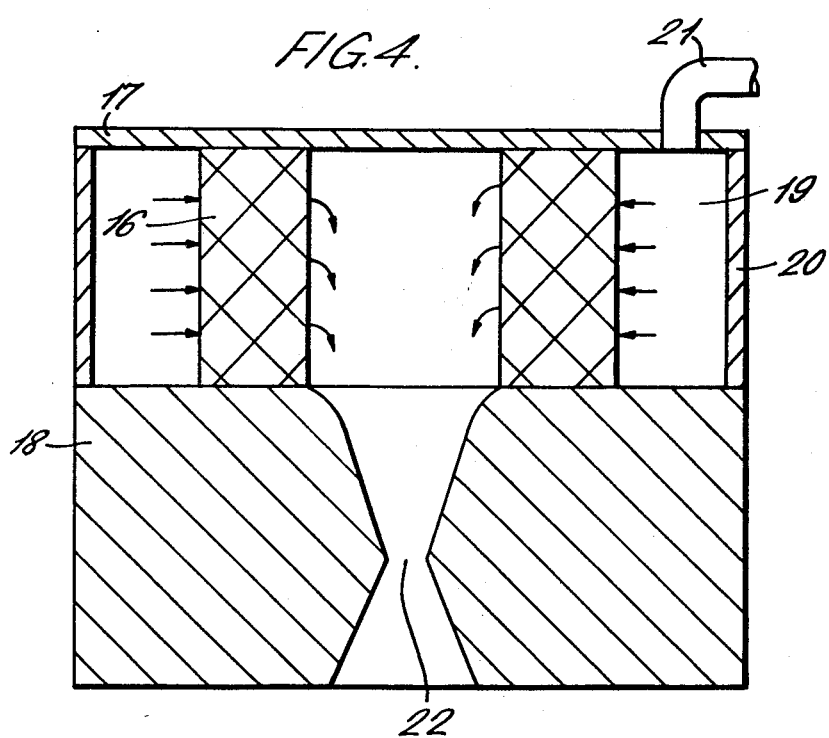

3,714,283
METHOD OF HEATING FLUIDS
Graham Rice, Reading, and James Francis Pollock, Henley, England, assignors to United Kingdom Atomic Energy Authority, London, England
Filed Aug. 3, 1970, Ser. No. 60,405
Claims priority, application Great Britain, Aug. 6, 1969, 39,483/69
Int. Cl. B01j 7/00; C07c 5/22, 11/00; C09f 3/00
U.S. Cl. 260—675.5          4 Claims

ABSTRACT OF THE DISCLOSURE

A method for pyrolysis of chemical fluids in which the fluid to be pyrolysed is permeated through a porous heater element to raise it to the required temperature. The product leaving the heater element is then rapidly cooled to control the resident time that the fluid is at the pyrolysis temperature.

---

This invention relates to heating of fluids and in particular to fractional distillation, pyrolysis, and catalysis of fluids.

Where fluids are required to be separated by a distillation of one or more of the constituents this is often difficult when the boiling point temperatures of the constituents differ only by a few degrees. Furthermore, pyrolysis or catalysis may require not only a very rapid heating and cooling process in order to suppress or minimize the formation of undesirable reaction products but also a very short period of exposure to high temperatures.

An example of a pyrolysis process requiring rapid heating and cooling is in the production of perfumery chemicals by the route starting with alpha pinene.

Perfumes are added to a wide range of household products either to neutralise an unpleasant odour or to render a product more attractive. Turpentine is considered to be a raw material for the production of synthetic aromatics; at present it is obtained either from the gum collected from pine trees or from the byproducts of the kraft papermaking process.

The composition of turpentine varies according to its source and consists mainly of alpha pinene, beta pinene and delta three carene in varying proportions (see Table I).

TABLE I.—TYPICAL ANALYSES OF TURPENTINE

| Source | Alpha pinene, percent | Beta pinene, percent | Delta three carene, percent |
|---|---|---|---|
| U.S.A. | 75 | 20 | |
| Australia | | 60 | |
| China | 92 | 4 | |
| East India | 77 | | 20 |
| Finland | 75 | 5 | 15 |
| France | 60 | 27 | |
| Greece | 95 | 2 | |
| India | 85 | 5 | |
| Japan | 85 | 10 | 5 |
| Mauritius | 45 | 46 | |
| New Zealand | 35 | 65 | |
| Portugal | 80 | 17 | |
| Russia | 75 | | 15 |
| Sweden | 80 | 5 | 15 |

A simple pyrolysis of beta pinene at 600° C. produces a high yield of myrcene which can be converted to the desired terpene alcohols.

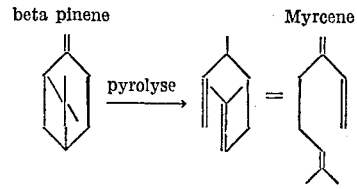

beta pinene → pyrolyse → Myrcene

As will be seen from Table I beta pinene is a minor constituent of most (but not all) turpentines. Furthermore it is available in limited quantities and is more expensive than alpha pinene. Therefore there is a strong incentive to use alpha pinene as a starting point in the production of the aromatics. Unfortunately, in the pyrolysis of alpha pinene it is very much more difficult to obtain a high yield of the ocimene, than it is to obtain myrcene from beta pinene (ocimene corresponds to the myrcene in the beta pinene route to production of the terpene alcohols and like myrcene may be converted to terpene alcohols).

When alpha pinene is pyrolysed, a mixture of products which is mainly ocimene, dipentene and allo-ocimene is obtained:

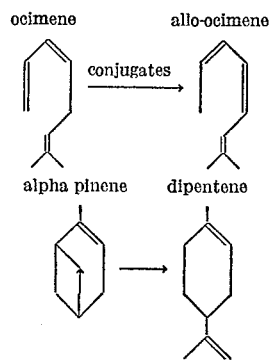

alpha pinene → ocimene → (conjugates) → allo-ocimene
              → dipentene

Dipentene is a very stable hydrocarbon which does not isomerise further: Ocimene will conjugate readily, giving allo-ocimene. The problem is therefore to optimise the yield of ocimene, whilst suppressing the formation of allo-ocimene since ocimene is the product of the pyrolysis which is useful in the production of terpene alcohols. The main factors for success in optimising the production of ocimene from alpha pinene by pyrolysis are:

(a) High temperatures (approx. 500° C. to 600° C.);
(b) Rapid heating (milliseconds);
(c) Short residence time at high temperature (milliseconds);
(d) Rapid cooling (milliseconds);
(e) Uniform heating of the pinene at it flows through the heater.

It is an object of the present invention to provide apparatus for treating fluids which treatment requires very short times at elevated temperatures and rapid cooling in order to maximise the production of a preferred product.

According to the present invention apparatus for the heat treatment of a fluid comprises a porous heater element, means to pass the fluid through the element, and cooling means to cool the product leaving the element.

The porous heater element is preferably a porous electrical resistance heater, Alternatively the heater element may be heated by thermal conduction for example, by passing a hot fluid through the heater prior to passing the fluid to be treated through the heater. For example, the heater element may be the form of a porous rotatable disc a part of which is positioned in a stream of heating fluids and part of which is positioned in a stream of the fluid to be heated. In which case means are provided to rotate the disc such that the portion of the disc heated by the heating fluid is moved into the stream of fluid to be heated to heat the fluid to be treated.

The porous heater may be made of carbon or other suitable material such as for example a ceramic such as silicon nitride. In the case of an electrically heated porous heater element the material would of course be electrically conductive. One suitable ceramic may be electrically conducting silicon nitride manufactured by the route disclosed in our copending application Ser. No. 32,201/69 filed June 25, 1969, now U.S. Pat. 3,670,467.

The cooling means may be means to direct a coolant fluid, which is preferably immiscible with the fluid being treated, at the product leaving the heater. The means to direct coolant at the product leaving the heater may be a fluid discharge jet opening. Alternatively the means to direct coolant fluid at the product leaving the heater may be a porous member which serves to dispense the coolant fluid. Additionally or alternatively the cooling means may comprise an expansion chamber. Furthermore the cooling means may comprise expansion nozzles in a sleeve which is integral with or spaced from the heater element.

The expansion of the product leaving the heater may be effected in an evacuated chamber.

A catalyst may be dispersed throughout the structure of the heater element such that catalysis and pyrolysis occur simultaneously.

According to a further aspect of the present invention a method of pyrolysis of a chemical fluid comprises permeating the fluid through a porous heater element, maintaining the fluid in the heater element for a predetermined time, and rapidly cooling the product leaving the heater element. One or more of the constituents of the products leaving the heater may be subsequently fractionally separated.

According to yet a further aspect of the present invention a method of separating constituents from a fluid comprises passing a fluid through a porous heater element and cooling the product leaving the heater element.

According to yet a further aspect of the present invention a method of pyrolysing alpha-pinene to yield ocimene comprises passing alpha-pinene through a porous heater element heated to a temperature at which a mixture of dipentene and ocimene is produced, cooling the said mixture to condense the dipentene and ocimene and to suppress the conjugation of ocimene to allo-ocimene, and fractionally distilling the mixture to obtain ocimene.

In the case when the product is to be pyrolysed the heater element may be heated to a temperature of the order of 500° C. to 600° C. The ocimene may be separated from the mixture of dipentene and ocimene by heating to a temperature of 176° C. to 178° C. at a pressure of 760 torr to vaporise the ocimene.

The present invention will now be described with reference to the accompanying drawings which are by way of example only and in which:

FIGS. 3 to 8 show diagrammatically different forms of pyrolysers according to the present invention suitable for use in the flow diagrams of FIGS. 1 and 2.

Figure 1:
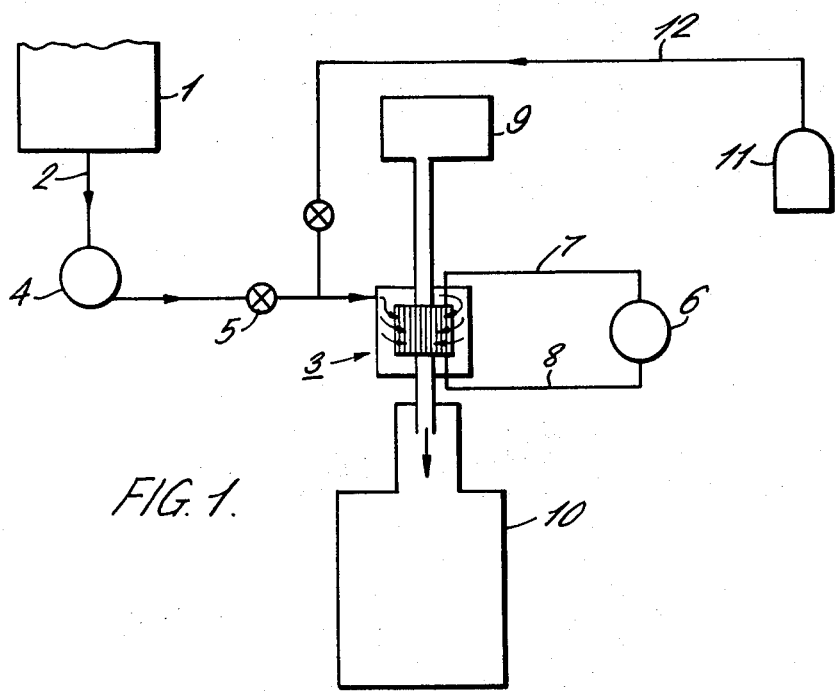
FIG. 1 is a flow diagram for pyrolysis of a fluid using one form of apparatus according to the present invention.

Referring to FIG. 1 the fluid to be pyrolysed is contained in tank 1 and is pumped through pipeline 2 and passed through a porous electrical resistance heater element 3 by a pump 4. Suitable electrical porous heater elements are also disclosed in our British Pat. 1,182,241. A valve 5 is provided to control the flow of the fluid from the pump 4. The porous heater element 3 is constructed from a porous electrical resistance material and is heated by passing an electrical current through the element from an electrical power supply 6 by way of leads 7 and 8 and is for example, a hollow cylindrical member. The fluid is heated to a temperature high enough to pyrolyse it by passing it through the heater element from the outside and the product leaving the heater element through the bore of the element is then rapidly cooled. Cooling may be achieved by using a coolant fluid such as for example water, steam or other immiscible fluid from a source of coolant fluid generally indicated by the numeral 9 which is directed at the product leaving the heater. The mixture of the coolant fluid and the product leaving the bore heater is then fed to a collection vessel 10 the interior of which may, or may not, be partially evacuated to effect further cooling. If desired a further fluid may be mixed with the fluid from tank 1 to suppress combustion in the case of pyrolysing a combustible fluid or pyrolysing a fluid which yields a combustible product. The fluid to suppress combustion may be fed from a source of supply 11 through pipe line 12 and valve 13 to the heater element 3. The product leaving the heater element 3 may be cooled by expanding it instead of using the coolant fluid.

Figure 2:
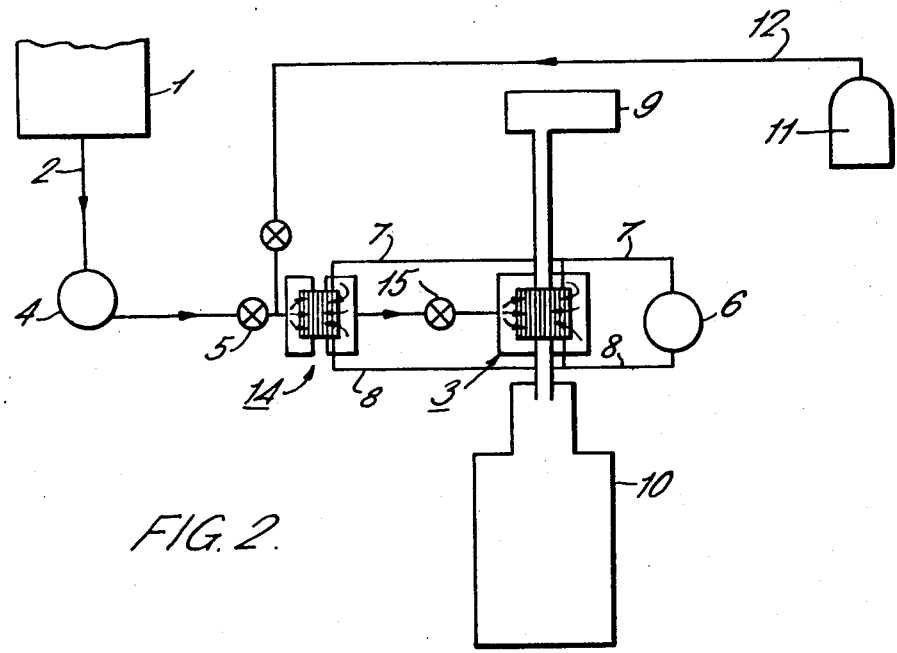
FIG. 2 is a second flow diagram for pyrolysis of a fluid using apparatus according to the present invention.

Referring to FIG. 2 there is shown a flow diagram resembling that of FIG. 1. Where similar components are used in FIG. 2 as in FIG. 1, the same numeral is ascribed to that component.

The only difference between FIG. 1 and FIG. 2 is the provision of an electrical resistance porous heater element 14 as a preheater in the pipeline 5. The heater element 14 serves to heat the fluid from tank 1 before it reaches the heater element 3 which functions as a super heater. A second valve 15 is provided in pipe line 5 to control the flow of fluid from the heater element 14 to the heater element 3. The heater elements 14 and 3 are connected in series or in parallel across the power supply 6 by the leads 7 and 8. Alternatively, each heater element may be connected to a separate power supply.

Referring to FIG. 3 there is shown one form of a pyrolyser suitable for use in the flow diagrams of FIGS. 1 and 2. The heater element 3 comprises a porous body 16 in the form of a cylinder. The body 16 is made from an electrically conducting material such as for example carbon, or electrically conductive silicon nitride, and is electrically connected to two electrodes 17 and 18 by which an electrical heating current may be passed through the body 16. An annular sealed cavity 19 is formed between the outer circumferential surface of the body 16 by a cylindrical sleeve 20 of insulating material sealed to the electrodes 17 and 18. The fluid to be heated is fed to the cavity 19 by way of an inlet pipe 21 sealed to electrode 17 and then flows through the porous body and is cooled in the bore of the body 1 by passing a coolant fluid from a source 9 in the direction of the arrow "A". The cooled product leaving the bore of body 16 is fed to the collection vessel 10 as described above. The heater element 14 of FIG. 2 may be similar to that shown in FIG. 3 but the heated fluid is not subjected to any cooling and the preheated fluid leaving the bore of the body 16 is fed directly to the cavity 19 of the heater element 3. A number of preheaters may be employed to raise successively the temperature of the fluid, and some or all of these may be in the form of recuperative or regenerative heat exchangers in which heat is supplied from a non electrical heat source such as waste hot fluid.

Referring now to FIG. 4 there is shown the pyrolyser of FIG. 3 modified in that a coolant fluid is not directed at the product leaving the body 16. Instead, the electrode 18 is provided with an expansion nozzle 22, and the fluid leaving the body is cooled by adiabatically expanding it as it leaves the body 16. The nozzle 22 may be sealably connected to an evacuated chamber (not shown) to further cool the product. Expansion of the product leaving the heater may be at subsonic or supersonic velocities.

Figure 5:
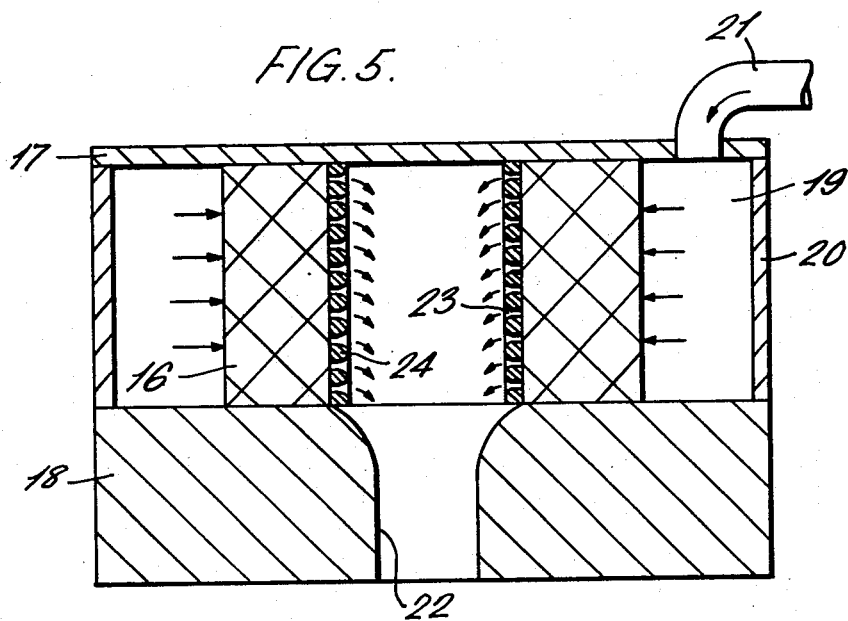

FIG. 5 shows a modified form of the pyrolyser of FIG. 4 in which a plurality of expansion nozzles 23 are incorporated in a sleeve 24 which is inserted in the bore of the body 16. The sleeve 24 may be an integral part of the body 16 or if desired the sleeve may be spaced from the body 16. The cavity so formed between the body 16 and the sleeve 24 may form a manifold for the nozzles 23.

Figure 6:
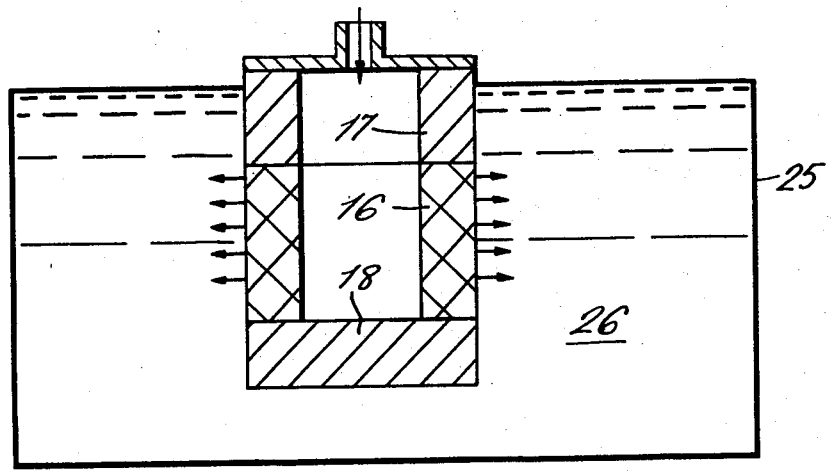

FIG. 6 shows diagrammatically a further form of pyrolyser which comprises a cylindrical porous body 16 positioned between electrodes 17 and 18 as is the case with the heater elements of FIGS. 3 to 5 but in this case the outer surface element is at least partly submerged in a bath 25 of coolant liquid 26. The fluid to be heated is fed to the bore of the body 16 under pressure and passes through the body 16 where it is heated and leaves the outer surface of the body 16 and is cooled by the coolant 26.

Figure 7:
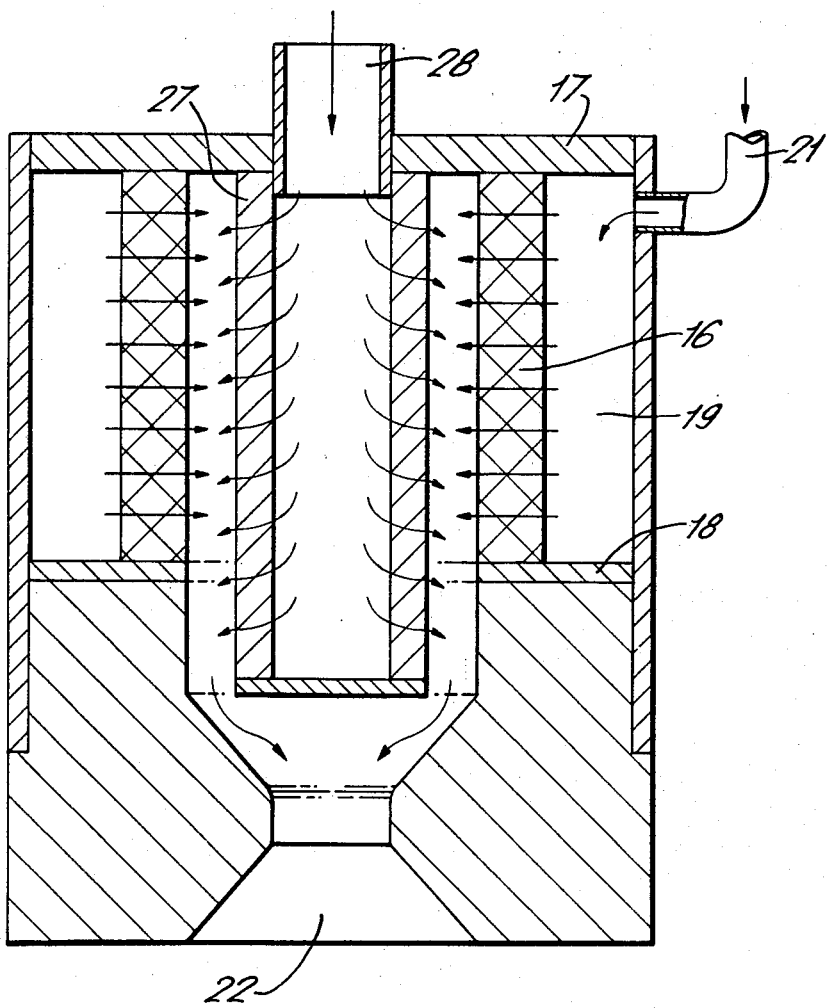

FIG. 7 shows diagrammatically a further form of pyrolyser which comprises a cylindrical porous electrical heater body 16 positioned between electrodes 17 and 18 as is the case with the heater elements of FIGS. 3 to 6. The cooling means is in the form of a closed cylinder of porous material 27 which acts as a dispenser to ensure intimate mixing of the product leaving the heater and the coolant fluid. Coolant is fed into the inlet 28 and the product to be pyrolysed is fed in through the inlet 21 to the chamber 19 and permeates through the heater 16. The cooled product leaves the pyrolyser through the expansion nozzle 22.

Figure 8:
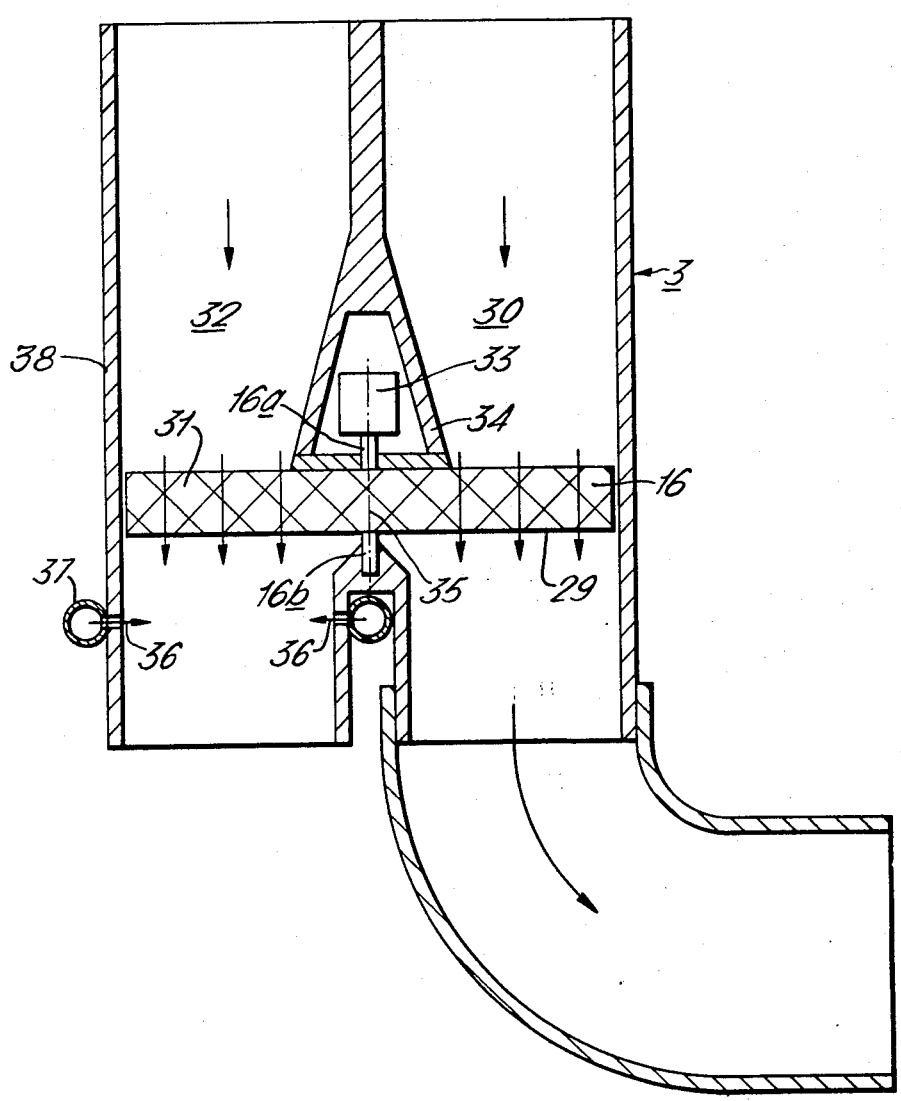

FIG. 8 illustrates a further form of pyrolyser in which the heater is in the form of a rotatable porous disc 16 of a suitable metal or ceramic mounted in bearings 16a and 16b.

A portion 29 of the disc is arranged to obturate, at least partly, a duct 30 in which hot fluid is passed to heat the disc 16. A further portion 31 is arranged to obturate at least partly a duct 32 in which the fluid to be pyrolysed is passed. A motor generally indicated at 33, housed in a fairing 34 is provided to rotate the rotor about the centre line axis 35 of the disc 16. In operation the disc is heated by the fluid flowing through duct 30 and the disc gives up heat to the fluid to be pyrolysed and thereby heats the fluid to a temperature at which the desired pyrolysis occurs.

The product is then cooled rapidly by directing jets of coolant fluid at the product leaving the heated disc from jet openings 35 fed from a suitable manifold 37.

It is to be understood that the disc may also be heated electrically in which case the disc is made from electrically conductive material.

The body 38 of the pyrolyser of FIG. 8 may be two castings suitably machined which are joined in the plane of the drawing.

A catalyst may be deposited through the structure of at least part of the body 16 such that catalysis and pyrolysis are effected together.

A thin sleeve of material which has a low or graded thermal conductivity may be provided at the interfaces between the porous heater element and the contacting fluids to give a gradual heating transition to the fluid adjacent the surfaces of the heater element compared with that throughout the remainder of the heater to prevent nucleated boiling of the liquid fluids.

Some important advantages of using a porous heating element followed by rapid cooling in pyrolysis and catalysis are:

(a) Rapid heating, including vaporising and superheating of the pyrolised fluid while enabling the bulk liquid to be maintained at a temperature sufficiently low to avoid polymerisation or other degradation, (b) Large surface area within the pore structure of the element allows high heat transfer rates and close control of fluid temperature during the rapid heating process.

(c) A small temperature difference exists between the heater element and the fluid and all the fluid flowing through the heater is uniformly heated.

(d) High heat rate per unit volume leads to a small size plant.

(e) The rapid cooling techniques together with a rapid heating process ensures that short residence times at high temperatures are achieved.

Porous heater elements will of course be designed to meet specific requirements, and such parameters as the size, shape, permeability, temperature of operation and the material of the porous heater element will be dependent on the nature of the fluid to be treated. Such factors as the temperature at which one achieves the desired pyrolysis of the fluid to be treated most efficiently, the viscosity, and flow rate of the fluid through the heater will influence the design of the heater.

A further advantage of using an electrically heated porous heater to effect pyrolysis is the ease at which the temperature may be controlled. We have found that using a porous carbon element it was possible to attain a temperature of 350° C. from cold state in less than 30 seconds when powered from a suitable supply without detriment to the heating element, and that the rapid response to changes in the electrical power supplied to the heater may be used to advantage to accurately control the temperature of the heater element.

The use of the apparatus of the present invention will now be described solely by way of an example as applied to the pyrolysis of alpha pinene to yield ocimene.

Alpha pinene is passed through the porous body 16 at a pressure of about 1 bar; the porous body is heated electrically to a temperature of about 600° C. The alpha pinene pyrolyses at this temperature to yield dipentene and ocimene. As ocimene conjugates to give allo-ocimene at a rate which depends on its temperature it is necessary to cool the ocimene content rapidly and therefore it is desirable to limit the time that the ocimene is at a temperature of 600° C. to periods of the order of 0.1 to 10 millisecs. To control the length of time that the pinene flowing through the heater is at the temperature of about 600° C., the mixture of dipentene and ocimene leaving the porous body 16 is cooled rapidly by passing it through a flow of coolant water or steam. The mixture of dipentene ocimene and coolant may then be separated by distillation firstly to remove the water content and then to remove the dipentene. However, at a pressure of 760 torr the boiling point of ocimene is in the order of 176° C. to 178° C. and the boiling point of dipentene is of the order of 178° C. to 180° C., therefore care must be taken when separating the ocimene from dipentene and accurate control of the temperature of the heater is essential. A porous heater element has the advantage that close control of temperature can be achieved as thus it may be used to advantage to heat the dipentene and ocimene mixture to effect separation of the ocimene and dipentene. In this instance the mixture of dipentene and ocimene is heated to a temperature at which only the ocimene is boiled off by passing it through a porous heater and the vapour is collected and subsequently condensed whilst at the same time the liquid dipentene is collected.

The porous heater element may be in the form of a disc or sheet located in the path of flow of the fluid to be heated instead of being cylindrical. The coolant flow may be caused to flow over a surface of the element if desired.

It is to be understood that the apparatus and methods of using the apparatus described above may be employed to fractionally separate constituents from any suitable fluid or for pyrolysing or catalysing any suitable chemical product.

Although the invention has been described with reference to the pyrolysis of α-pinene the invention may be used for the pyrolysis of other chemicals, particularly, although not exclusively, when it is desired to carry out the pyrolysis at very high temperatures and it is also desirable to heat the chemical to a high temperature very rapidly and to maintain the product at the desired temperature for very short periods of time (typically of the order of 0.1 to 10 milliseconds).

An example of alternative processes to that of pyrolysing terpenes such as alpha-pinene is in the production of ethylene from feedstocks such as ethane, propane, butane, naphtha in which pyrolysis is achieved by heating to temperatures of the order of 600° C. to 900° C.

A further example of the use of apparatus of the present invention is in the production of acetylene from feedstocks such as methane, propane, butane in which it has been suggested that temperatures of the order of 1800° C. to 2000° C. are required. By using a porous heater and quenching the product leaving the heater, the yield of the desired product may be optimized.

Further examples of the use of the present invention are in the production of styrene, vinyl chloride, phenol and other related compounds from various suitable hydrocarbon materials.

The term porous heater element includes heater elements which have a plurality of channels dispersed throughout their structure. Which channels may be formed by the voids of a lattice structure such as for example, a honeycomb structure.

We claim:

1. A method of pyrolysing alpha-pinene to yield ocimene comprising passing alpha-pinene through a porous heater element heated to a temperature at which a mixture of dipentene and ocimene is produced, cooling the said mixture to condense the dipentene and ocimene and to suppress the conjugation of ocimene to allo-ocimene, and separating ocimene from the mixture.

2. A method according to claim 1 wherein the alpha-pinene is heated to 600° C. to effect pyrolysis.

3. A method according to claim 1 wherein the ocimene is separated by heating the mixture to a temperature of 176° C. to 178° C. at a pressure of 760 torr to vapourise the ocimene.

4. A method of fractionally separating constituents having different vaporization temperatures from a fluid containing the said constituents comprising passing a fluid through the pores of a porous heater element heating the element to a temperature at which one or more selected constituents of the fluid will vaporize, separating the vaporized constituent from the remainder of the fluid and cooling the product leaving the heater element.

References Cited

UNITED STATES PATENTS

| | | | |
|---|---|---|---|
| 1,925,784 | 9/1933 | Williams | 48—DIG. 5 |
| 1,880,306 | 11/1932 | Wulff | 48—DIG. 5 |
| 2,387,731 | 10/1945 | Allen | 260—680 |
| 1,917,627 | 7/1933 | Wulff | 260—679 |

DELBERT E. GANTZ, Primary Examiner

G. E. SCHMITKONS, Assistant Examiner

U.S. Cl. X.R.

23—277 R; 48—DIG. 5; 203—100; 208—48 R, 48 Q; 260—677 R, 679 R, 683 R, 683.2